May 19, 1942. G. H. CHAMBERLAIN, JR 2,283,422
TRIPOD
Filed Nov. 4, 1937 3 Sheets-Sheet 2
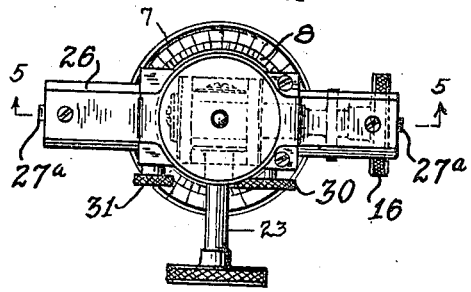
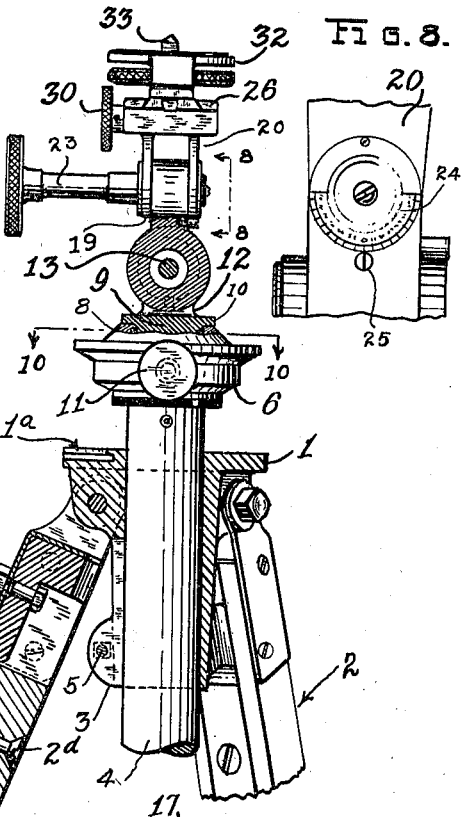
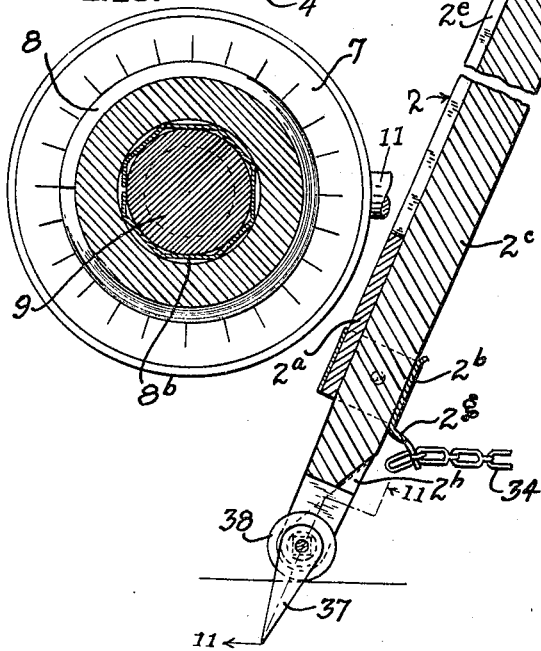
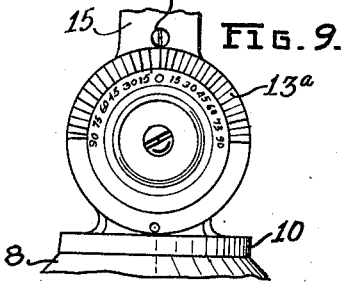
INVENTOR.
GEORGE H. CHAMBERLAIN JR.
BY Milburn and Milburn
ATTORNEYS.

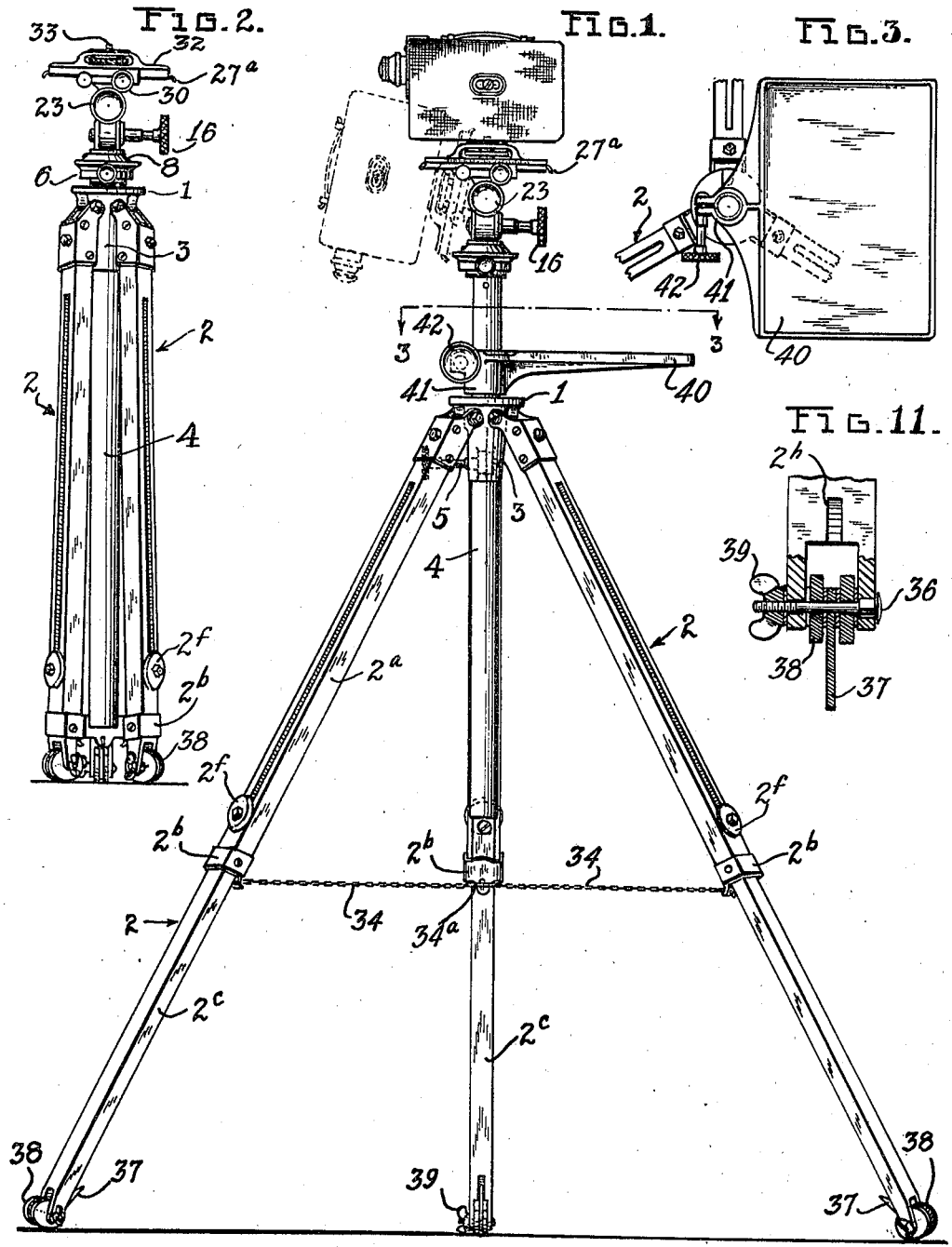

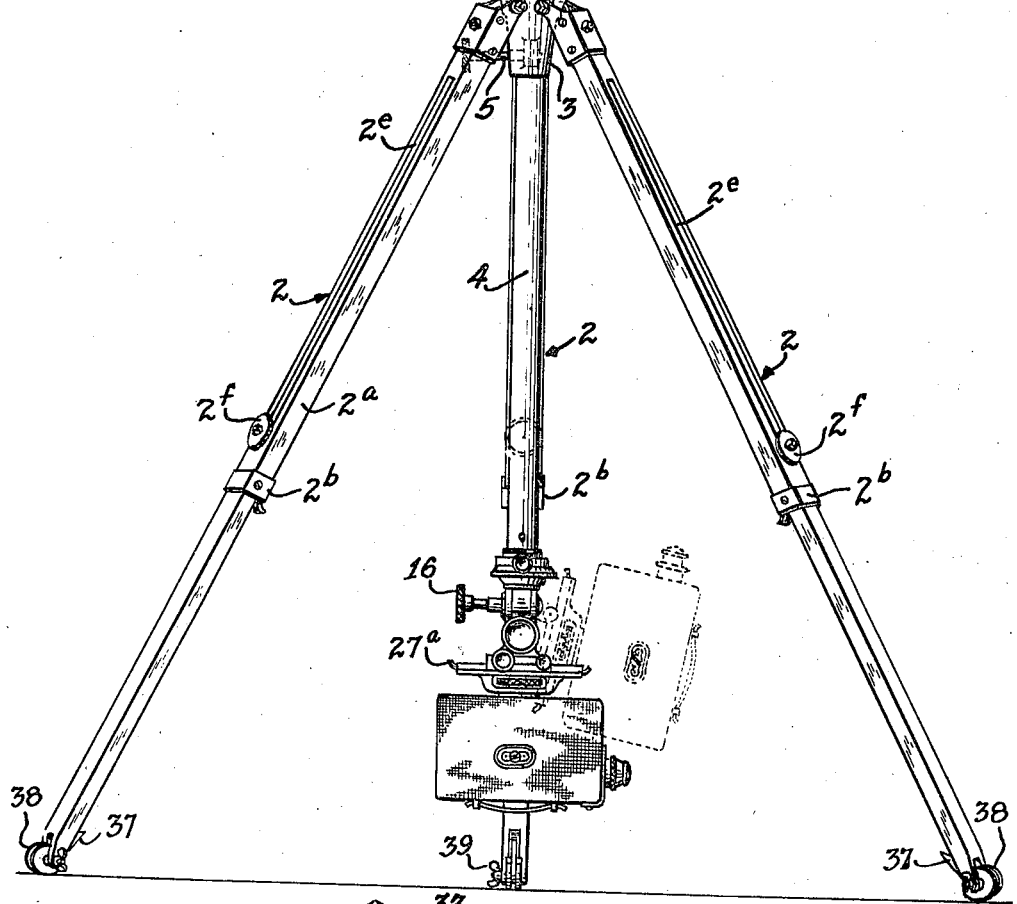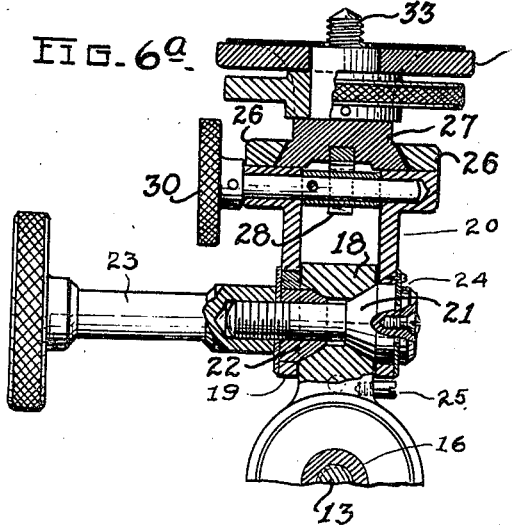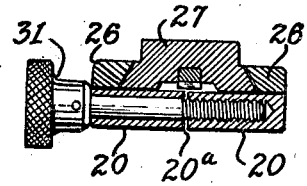

Patented May 19, 1942

2,283,422

UNITED STATES PATENT OFFICE 2,283,422

TRIPOD

George H. Chamberlain, Jr., San Jose, Calif.

Application November 4, 1937, Serial No. 172,756

1 Claim. (Cl. 248—186)

This invention relates to an improved tripod for a camera or the like and is a continuation in part of my co-pending application, Serial No. 45,470, filed October 17, 1935, now Patent No. 2,145,584, January 31, 1939.

In addition to the same general adjustments and uses as are disclosed in the aforesaid application, the present improved form of device embodies several further features of construction and adjustment whereby there are obtained additional advantages in connection with a tripod and universal head.

For instance, in the present device, I have provided a means for adjusting the camera support vertically, either in upright or inverted position, and the camera in inverted position is capable of the same adjustments as when in normal position. This feature constitutes one of the objects of the present invention.

A further feature which constitutes another object of the present invention, is the provision of a tray and means for supporting the same in a convenient manner.

Another feature of the present invention is the provision of an adjustable duplex form of foot for facilitating supporting engagement with different kinds of floors or ground, as will be explained.

Another feature of the present invention is the improved structure and arrangement of dial base, camera-supporting means and index member, whereby there is permitted more convenient and effective rotary adjustment for a given angle.

Still another feature of the present invention is the arrangement of extensible legs which can also be collapsed about the vertically extensible post of the camera-supporting means.

All of the features which are above briefly referred to and which will be more fully explained, constitute specific objects of the present form of invention.

Other objects will appear from the following description and claims when considered together with the accompanying drawings.

Fig. 1 is an elevation of the present device with the legs in extended position and the safety chain attached to the legs, this figure illustrating also the use of the tray and indicating some of the possible adjustments for the camera-supporting means;

Fig. 2 is an elevation of the device with the legs in collapsed position;

Fig. 3 is a view taken on line 3—3 of Fig. 1;

Fig. 4 is a top plan view;

Fig. 5 is a view taken on line 5—5 of Fig. 4;

Fig. 6 is a view corresponding to line 6—6 of Fig. 5 and illustrating also the structure and arrangement of the legs;

Fig. 6a is a view taken on line 6a—6a of Fig. 5;

Fig. 7 is a view taken on line 7—7 of Fig. 5;

Fig. 8 is a view taken on line 8—8 of Fig. 6;

Fig. 9 is a view taken on line 9—9 of Fig. 5;

Fig. 10 is a view taken on line 10—10 of Fig. 6;

Fig. 11 is a view taken on line 11—11 of Fig. 6; and

Fig. 12 is an elevation of the present device with the legs in extended position but with the camera-supporting means in inverted position.

It is to be understood that the present form of disclosure is merely for purposes of illustration and that there may be devised various other modifications and variations without departing from the spirit of the present invention as herein described and claimed.

In a general way, the present form of device comprises a tripod having a junction member at the top thereof with a vertical opening in which vertically adjustable engagement is provided for the post of the camera-supporting head. This post is reversible so that the camera can be supported in position above the tripod or between the legs thereof.

Referring now to the drawing, the junction member 1 has the three legs 2 pivoted thereto upon the under-side thereof. The junction member 1 has an extended bearing portion 3 within which the hollow post 4 engages. The bearing 3 is split and has the clamping screw means 5 by which the post 4 may be firmly engaged in set position or released for adjustment.

The hollow post 4 has secured in the upper end thereof the depending projection of the dial base 6 which remains in fixed position upon the post 4. The upper circular surface of the dial base 6 is provided with the dial 7 for co-operation with an index mark provided upon the bevel surface of the index member 8 which is frictionally mounted about the spindle 9a of the camera-supporting head 9 for movement either with or independently of the same. This is especially useful in the taking of panoramic pictures or the like. That is, the index member 8 can be rotatably adjusted about the spindle 9a of the camera-supporting head 9 so as to bring the index to correspond with zero on the dial 7 wherever the zero point might happen to be after the tripod and camera are set up and the camera pointed in the direction desired. This particular feature obviates the necessity of resetting the dial or always having to calculate the degree of movement in a manner that is apt to be confusing. The index member 8 is mounted between the dial base 6 and an annular flange 10 on the camera-supporting head 9. The index member has a knob 8a to facilitate manipulating the same. The frictional engagement of the index member 8, by virtue of spring brass ring 8b around its core, unless restrained by the hand of the operator, is such that it will move bodily with and virtually as part of the camera-supporting head 9. The camera-supporting head 9 is swivelled within the dial base 6 by means of the spindle collar 9b and can be secured in position to which adjusted, by means of the screw 11 which engages the spindle 9a. The spindle 9a rotates in a bronze bushing.

The lower part of the camera-supporting head 9 has the oppositely disposed ears 12 extending upwardly from the flange 10, and these ears are apertured to receive the cone-headed bolt 13 and free cone 14 which together form a means of engagement for link 15. The wheel nut 16 engages the threaded end of bolt 13 for releasably locking the parts in position to which adjusted. The head of bolt 13 and the free cone member 14 have spline engagement so as to prevent turning of the same. The dial 13a is provided on one side for the purpose of indicating the angle of adjustment in connection with an index mark provided on the head of screw 17 or in some other manner on the link 15.

The link 15 has an upper portion 18 which extends between the depending ears 19 of the saddle 20. These ears are apertured so as to receive the cone-headed bolt 21 and free cone 22 which serve to clamp the adjustable saddle in set position by manipulation of the wheel nut 23. The dial 24 is provided on the head of the bolt 21 and co-operates with the index 25 on the link 15 or in some other suitable manner.

Secured along the top edge portions of the saddle 20 are the gibs 26 which are beveled so as to provide a slide-way for the slide 27. The slide 27 can be moved back and forth by means of rack and pinion mechanism 28—29 operated by wheel 30 on the pinion shaft, and the slide 27 can be locked in set position by means of the screw 31 which is adapted to clamp the one split end 20a of the saddle 20 against the slide 27. The slide 27 carries the means 32 for supporting the camera, the screw 33 being provided for attaching the same, as will be understood. The ends of the slide rack 27 have down-turned end portions 27a to prevent the same from being moved out of engagement with its slide-way, these projections 27a being adapted to engage the ends of the saddle 20 as a stop means.

As will be observed, the combined effect of the two pivotal connections at the upper and lower ends of the link 15 is that of a universal adjustment between the camera-supporting head 9 and the saddle 20. Thus the camera may be set at any desired angle and the extent of such adjustment can be accurately ascertained.

Also, the camera and its support can be turned about a vertical axis and clamped in position by means of screw 11; and it can be moved laterally by means of the rack and pinion mechanism 28—29 and clamped in position by the screw 31. And, too, the height of the camera can be varied by raising or lowering the same on the post 4 which can be clamped in desired position by the screw 5. The post 4 is also free to turn in the bearing portion 3, although this is not necessary in view of the other rotary adjustment about a vertical axis, as above explained.

The junction member 1 is provided with a cut-out portion indicated at 1a to accommodate a universal level.

The legs 2 are hinged to the junction member 1 and are extensible. The outer portion 2a, in each case, is three-sided and is open upon its under side. The band 2b extends about the lower end of portion 2a and accommodates the inner telescoping leg portion 2c which has a bolt 2d extending through a longitudinal slot 2e in the outer leg portion 2a for clamping engagement by means of the nut 2f. Thus, the legs can be extended to any point desired and locked in either extended or telescoped position. The cap on the threaded end of bolt 2d prevents the nut 2f from coming off of the bolt.

Each band 2b has an inwardly projecting ear 2g with an aperture to receive the link of a chain 34. There are three such chains, one for each leg, and they are connected at their inner ends to a ring 34a. These chains are of the same length and their free ends can be detachably connected to the ears 2g by inserting a certain link in the aperture of the ear, in each case, so as to engage the edge of the aperture and thereby form a locking engagement. The purpose of the 3-part chain is to serve as a safety measure for bracing the legs of the tripod, as for instance when the tripod is set upon a slippery floor.

The lower end of each leg portion 2c is formed with a clevis, and a bolt 36 extends therethrough and also through the steel spike 37 and the rubber washers or disks 38 upon opposite sides of the spike 37. The leg portion 2b is cut out at 2h so as to accommodate the spike 37 when in retracted or idle position, as indicated in Figs. 1 and 12. By loosening the nut 39, the spike may be turned down into active position, as indicated in Figs. 6 and 11, or up into idle position, as in Figs. 1 and 12. The spike 37 and the rubber disks 38 are so formed with respect to each other that when the spike is lowered, its point extends beyond the disks 38; but when the spike is turned up to idle position, the disks 38 project down beyond the spike so that they can rest upon the floor. The point of the spike is intended for use upon the ground or other surface as for instance rock, while the rubber disks 38 are intended for indoor use.

As will be seen from Fig. 2, the legs can be collapsed and folded compactly about the post 4 when the post is in lowered position. The legs 2 are only of two parts each but they afford the required rigidity and length when extended and they require comparatively small space when the device is collapsed.

The tray 40 has an apertured neck 41 through which the post 4 can be inserted, and the neck 41 is split so that it can be clamped about the post 4 by means of the screw bolt 42. This tray can be placed at any point desired as it can be raised or lowered or turned about the post 4, and then clamped in the desired position. This tray can serve as a convenient support for auxiliary apparatus during the taking of pictures; or it can be used to support a specimen which is to be inspected by means of a microscope supported by special attachment on the camera support, or which is to be photographed by a camera from a position corresponding to that of the microscope.

In Figs. 1 and 6, it is supposed that the camera is to be used in the ordinary manner, that is from a position above the tripod; but with my invention, the post 4 and the parts carried thereby can be given an inverted position and the camera supported at a point below the top of the tripod, as illustrated in Fig 12. The purpose of such position is to take an inverted plan view of an object that is elevated from the floor or ground, or to take other views of an object that occupies position on or near the ground or floor. As will be observed from Fig. 12, the camera when in this position, can be given any of the various adjustments of which it is capable when occupying the usual elevated position indicated in Figs. 1 and 6; and this feature is especially useful in the work of geologists, naturalists and other scientists when photographing rock formations, plant life, insects, etc.

The calibration of the rotary movement of the camera-supporting head and of the combined universal movements, and the calibration of the slide movement, permit of scientific accuracy in many different uses.

With my device, it is possible to employ an ordinary camera in the taking of stereoscopic or panoramic pictures, this being made possible by the accurate lateral adjustment. Furthermore, the slide adjustment constitutes a means of focusing a rigid type camera and also acts as a set-over adjustment when copying. The tray 40 serves as a very convenient support for the subject manner which is to be copied.

With the ready vertical adjustment of the post 4, there is eliminated the necessity and inconvenience of repeatedly adjusting the legs of the tripod when it is desired to change the elevation, as would otherwise be required.

Besides being capable of use with a camera, my tripod can be used also to great advantage with a picture projector, in which case the tray proves a great convenience as a support for the box of slides. This tripod can also be employed for mounting range finders, telescopes and microscopes. In fact, my improved tripod may have various uses; already it has been adopted by physicians, dentists, orthodontists, photographers, architects, engineers, scientists, universities and police departments. Further uses and advantages of this improved device will readily suggest themselves to those who are familiar with the art to which this invention relates.

What I claim is:

In a tripod head in which a dial base has a dial thereon and in which a camera-supporting means has a spindle rotatably adjustable about a vertical axis in said dial base, said means having an annular shoulder, and an index ring member having an index adapted for co-operation with said dial and having releasable frictional engagement about said supporting means and being rotatably adjustable thereabout so as to permit setting the index ring member independently with respect to the supporting means and the dial, said index ring member being arranged between and in complete engagement with said annular shoulder and said dial so as to afford bearing engagement therebetween.

GEORGE H. CHAMBERLAIN, JR.